(12) United States Patent
Williams et al.

(10) Patent No.: US 9,675,917 B2
(45) Date of Patent: Jun. 13, 2017

(54) PROTECTIVE HOUSINGS FOR A SYSTEM

(75) Inventors: Richard T. Williams, Glenmoore, PA (US); Carl Beiswenger, Pottstown, PA (US)

(73) Assignee: GENERAL ECOLOGY, INC., Exton, PA (US)

( * ) Notice: Subject to any disclaimer, the term of this patent is extended or adjusted under 35 U.S.C. 154(b) by 629 days.

(21) Appl. No.: 12/653,104

(22) Filed: Dec. 8, 2009

(65) Prior Publication Data

US 2014/0027130 A1    Jan. 30, 2014

(51) Int. Cl.
| | | |
|---|---|---|
| *B01D 35/00* | (2006.01) | |
| *B01D 35/30* | (2006.01) | |
| *C02F 1/00* | (2006.01) | |
| *B01D 35/14* | (2006.01) | |

(52) U.S. Cl.
CPC ............ *B01D 35/30* (2013.01); *B01D 35/14* (2013.01); *C02F 1/001* (2013.01); *C02F 2201/001* (2013.01); *C02F 2201/006* (2013.01)

(58) Field of Classification Search
CPC .. A62C 2/10; A62C 3/06; A62C 3/065; A62C 3/00; A62C 3/0214; A62C 3/0257; B01D 35/14
USPC ............ 312/409; 169/45, 48; 210/398; 220/560.01
See application file for complete search history.

(56) References Cited

U.S. PATENT DOCUMENTS

| | | | |
|---|---|---|---|
| 4,685,327 A * | 8/1987 | Sharp ............... | 73/49.2 |
| H601 H * | 3/1989 | Carlton ............... | C08K 7/10 |
| | | | 501/38 |
| 5,092,024 A * | 3/1992 | McGarvey ............. | 29/460 |
| 5,128,034 A * | 7/1992 | Kool .................. | 210/232 |
| 5,314,027 A * | 5/1994 | Wood ................. | 169/60 |
| 5,595,431 A * | 1/1997 | Mlakar ................ | 312/409 |
| 6,418,962 B1 | 7/2002 | Wozniak et al. | |
| 6,736,473 B2 * | 5/2004 | Cleveland et al. ...... | 312/409 |
| 6,737,131 B1 | 5/2004 | Garcia | |
| 6,805,848 B2 | 10/2004 | Hertzler | |
| 7,397,219 B2 * | 7/2008 | Phillips ............... | H01M 2/1022 |
| | | | 320/112 |
| 7,628,113 B2 * | 12/2009 | Pallo et al. ........... | 109/75 |

(Continued)

FOREIGN PATENT DOCUMENTS

| | | |
|---|---|---|
| EP | 0270303 | 6/1988 |
| EP | 0300931 | 1/1989 |
| WO | WO 2006039275 A2 * | 4/2006 |

OTHER PUBLICATIONS

Noryl PPO (Modified Polyphenylene Oxide) MDS, Plastics International.*

(Continued)

*Primary Examiner* — Arthur O Hall
*Assistant Examiner* — Viet Le
(74) *Attorney, Agent, or Firm* — John F. A. Earley, III; Frank J. Bonini, Jr.; Harding, Earley, Follmer & Frailer, P.C.

(57) ABSTRACT

An apparatus for filtering and/or purifying and/or conditioning a fluid comprises a pressure vessel having an inlet for introducing fluid into the pressure vessel and an outlet for removing fluid from the pressure vessel, filtering medium positioned inside the pressure vessel for filtering and/or purifying and/or conditioning fluid, and a shell surrounding the pressure vessel, the shell having sufficient anti-flammability properties to be resistant against fire to protect the pressure vessel from fire.

27 Claims, 12 Drawing Sheets

(56) References Cited

U.S. PATENT DOCUMENTS 7,843,689 B2 * 11/2010 Moore et al. ................. 361/690
2008/0167422 A1 7/2008 Hashimoto

OTHER PUBLICATIONS

Marlex Polypropylenes—Filled Compounds MSDS, Jan. 8, 2008, Phillips Sumika, pp. 1-2.*
International Search Report from PCT International Application No. PCT/US2010/003115.
Search History from PCT International Application No. PCT/US2010/003115.
Written Opinion of the International Searching Authority from PCT International Application No. PCT/US2010/003115.
Supplemental European Search Report from European Patent Application No. 10836311.0-1356.

* cited by examiner

Unprotected - Under Propane Torch

Fig. 8

Unprotected – Continues to Burn

Fig. 9

1st 12-second torch burn

Fig. 10

After 1st 12-second burn

Fig. 11

2nd 12-second torch burn

Fig. 12

After 2nd 12-second torch burn

Fig. 13

Shell - 1st 12-second propane torch burn

Fig. 14

Shell - 2nd 12-second propane torch burn

Fig. 15

Shell exterior after 2 12-second burns

Fig. 16

Shell interior after 2 12-second burns

Fig. 17

PROTECTIVE HOUSINGS FOR A SYSTEM

BACKGROUND OF THE INVENTION

1. Field of the Invention

This invention relates to housings for systems, and more particularly is concerned with protective housings for a system that protect the system from its environment and that protect the environment from the system, wherein the protective housings include a first or inner housing for holding the system and a second or outer housing surrounding the first or inner housing and the system held therein, and wherein the first or inner housing is compatible with the needs of the system and the second or outer housing has sufficient properties to provide protection against damage caused by outside agencies found in the environment of use of the system.

2. Description of the Prior Art

Generally, a housing around a system protects the system from its environment. For example, a housing may provide protection of a system contained or held in the housing by blocking one or more outside agencies, such as objects, sunlight, chemicals, temperature, electrical interference, and fire, found outside the system in the environment of use of the system, from coming into contact or interfering with the system, thereby protecting the system from being damaged or compromised by one or more of such outside agencies. Further, generally, a housing provides structure or support to the system, and must meet the needs called for by the system.

In some instances, a housing may provide all of the structure and protection required, being compatible with the needs of the system while at the same time having sufficient properties to fulfill the protection requirements demanded by the environment in which the system is used.

However, there are other instances where the housing meets the needs of the system, such as the structure and support requirements of the system, but does not meet the protection requirements demanded by the environment in which the system is used. For instance, in many aircraft, apparatuses for filtering and/or purifying and/or conditioning water are provided in galleys for providing potable drinking water, with each such apparatus comprising a housing (e.g., a pressure vessel) and filtering medium held within the housing, that is, the pressure vessel. The pressure vessel in many cases is made from polypropylene. While the polypropylene pressure vessel has sufficient strength to handle the pressure created within the pressure vessel and polypropylene is compatible with the production of potable water, polypropylene is flammable. Accordingly, while the housing, that is, the polypropylene pressure vessel, meets the needs of the water filtering/purifying/conditioning system to enable the production of potable water, the polypropylene pressure vessel does not protect the water filtering/purifying/conditioning system against catching on fire if a fire broke out in the galley. For example, polymers that meet the anti-flammability requirements desired for a water filtering/purifying/conditioning pressure vessel used in the galley of an airplane are not strong enough to handle the pressure created within the pressure vessel and/or are not compatible with producing potable drinking water or may be excessively expensive, heavy or sub-optimal in other attributes.

Therefore, a problem exists where a housing meets the needs of a system, but does not meet the protection requirements demanded by the environment in which the system is used.

SUMMARY OF THE INVENTION

It is an object of the invention to provide a solution to the problem of a housing that meets the needs of a system, but does not meet the protection requirements demanded by the environment in which the system is used.

This object and other objects are accomplished in accordance with the invention by providing an apparatus for protecting a system from being damaged by an outside agency found outside the system in the environment of use of the system and/or protecting the environment from being damaged from being exposed to material from the system, wherein the apparatus has a first housing for holding the system that is compatible with the needs of the system, and a second housing that has sufficient properties to provide protection against damage to the system caused by outside agencies found in the environment of use of the system.

In a preferred embodiment of the invention, the apparatus comprises an apparatus for filtering and/or purifying and/or conditioning a fluid such as water, which includes a pressure vessel having an inlet for introducing fluid into the pressure vessel and an outlet for removing fluid from the pressure vessel, filtering medium positioned inside the pressure vessel for filtering and/or purifying and/or conditioning fluid, and a shell surrounding the pressure vessel, the shell having sufficient flammability properties to be resistant against fire to protect the pressure vessel from fire.

DETAILED DESCRIPTION

Turning now to the drawings, there is shown in FIGS. 1 to 7 two preferred embodiments of the invention. These preferred embodiments are presented herein to illustrate the invention and should not be seen as limiting the scope of the invention to these preferred illustrative embodiments.

Referring first to FIGS. 1 to 5, a first embodiment of the invention is shown, which comprises an apparatus 11 for filtering and/or purifying and/or conditioning a fluid, such as water.

The apparatus 11 includes a canister 12, such as that shown and described in our U.S. patent application Ser. No. 12/319,219, which is incorporated herein by reference. The canister 12 has a pressure vessel 13 for holding a filtering medium 15, such as a cartridge, loose media, and the like, for filtering and/or purifying and/or conditioning fluid. Preferably, the pressure vessel 13 comprises a cover 17 and a bowl 19. Preferably, the cover 17 has an end wall 21, a side wall 23 extending away from the end wall 21, and a rim 25 formed on the end of the side wall 23, and the bowl 19 has an end wall 27, a side wall 29, and a rim 31 formed on the end of the side wall 27.

The cover 17 and the bowl 19 preferably are made from a polymeric material, such as polypropylene. Depending on the specific requirements of the pressure vessel 13, other polymers, such as acetal, ABS, or polysulfone, may be used to form the cover 17 and the bowl 19. After the filtering material 15, such as the cartridge shown and described in our U.S. patent application Ser. No. 12/319,219, which is incorporated herein by reference, is positioned in the cover 17 and the bowl 19, the cover 17 and the bowl 19 are joined together along their respective rims 25 and 31, preferably by spin welding, to form the pressure vessel 13.

In the illustrative embodiment of the invention shown in FIGS. 1 to 5, the pressure vessel 13 has an inlet port and an outlet port formed at the end wall 21 of the cover 17, and the inlet port is connected to an inlet member of the cartridge and the outlet port is connected to an outlet member of the cartridge such that fluid to be filtered and/or purified and/or conditioned may flow via the inlet port into the pressure vessel 13, then into and through the cartridge (filtering medium 15), and then from the cartridge to and through the outlet port of the pressure vessel as filtered and/or purified and/or conditioned fluid.

When the pressure vessel 13 is to be oriented during use such that the bowl 19 is positioned above the cover 17, preferably, the bowl 19 is provided with a venting device 33, such as that shown and described in our U.S. patent application Ser. No. 12/319,219, which is incorporated herein by reference. Preferably, the outside cap of the venting device 33 is formed from materials that provide an inner surface that is compatible to the production of potable water and an outer surface that is resistant to fire.

The apparatus 11 also has a shell or shroud 35 that surrounds the pressure vessel 13 to protect the apparatus 11 from being damaged by an outside agency found outside the apparatus 11 in the environment of use of apparatus 11 and/or for protecting such environment from being damaged caused by being exposed to material of the filtering medium 15 and/or material of the pressure vessel 13 if the pressure vessel is damaged. In this illustrative example of the invention, the shell 35 is provided, in part, to protect the pressure vessel 13 from the outside agency of fire if a fire broke out, for example, in an airplane galley where the apparatus 11 was positioned to provide filtered and/or purified and/or conditioned water from the water system of the airplane. Accordingly, in this embodiment of the invention, the shell 35 has sufficient anti-flammability properties to be resistant against fire to protect the pressure vessel 13 from fire.

Preferably, the shell 35 is formed from a polymer containing a fire retardant. A particularly preferred polymer for the shell 35 is polypropylene having the fire retardant contained therein. Other polymers, such as polyethylene, having a suitable fire retardant mixed therein, may be used in forming the shell 35. Preferred fire retardants include char-forming intumescent based fire retardants (e.g., aminophosphate based fire retardants) and metal hydroxide (e.g., magnesium hydroxide) based fire retardants. Preferably, the fire retardant is mixed throughout the polymer resin before the shell 35 is formed from the polymer resin. Preferably, the "polymer/char-forming intumescent based fire retardant" composition has about 25% to about 35% by weight fire retardant in the composition, and preferably, the "polymer/metal hydroxide based fire retardant" composition has about 50% to about 60% by weight fire retardant in the composition.

Figure 1:
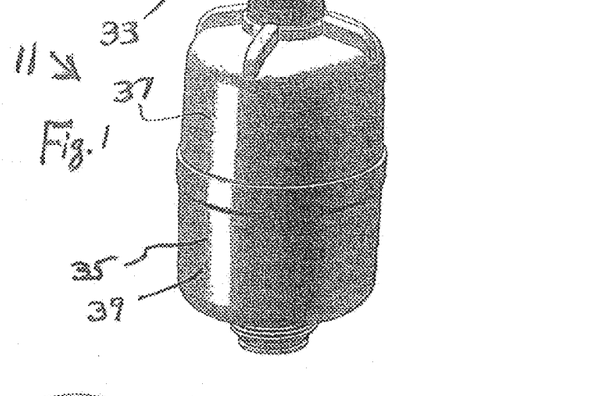
FIG. 1 is a perspective view of a first illustrative embodiment of the invention, wherein an apparatus 11 constructed in accordance with the invention for filtering and/or purifying and/or conditioning a fluid is shown.
Figure 2:
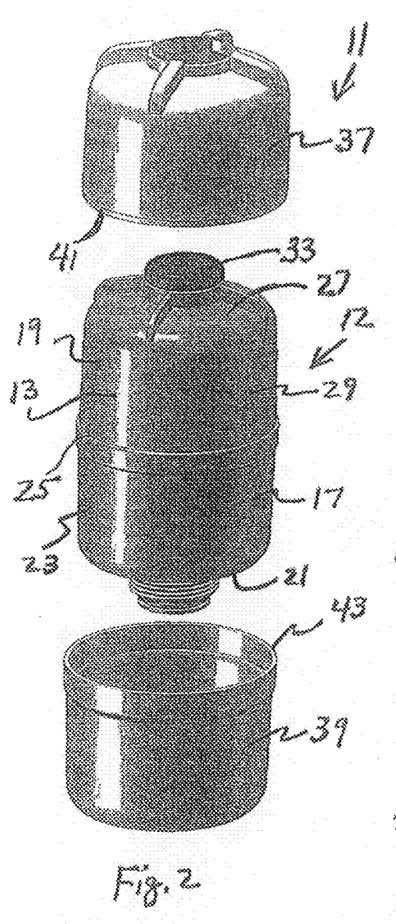
FIG. 2 is a partially exploded view of the apparatus shown in FIG. 1, with the shell cover and the shell bowl of the shell being exploded away from the pressure vessel that the shell surrounds.
Figures 3, 4:
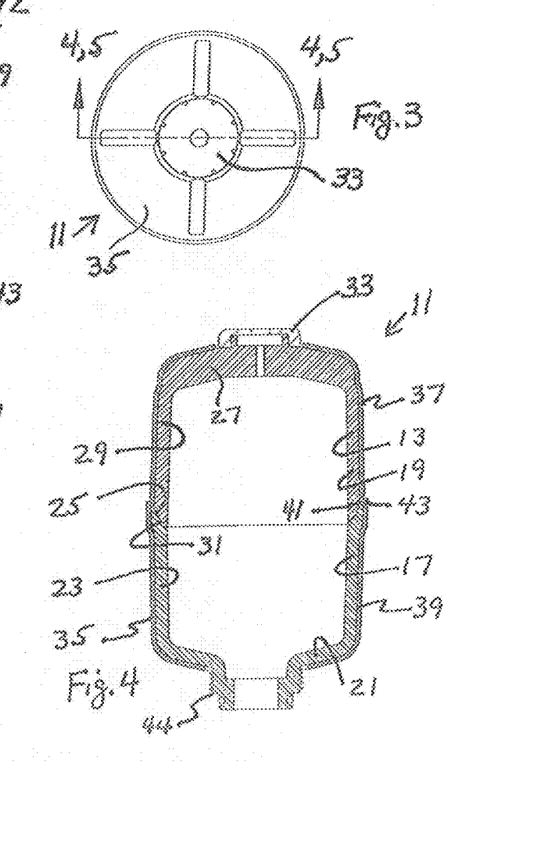
FIG. 3 is a top plan view of the apparatus shown in FIG. 1.
FIG. 4 is a view in cross-section taken along the lines and arrows 4-4 shown in FIG. 3, except the cartridge housed inside the pressure vessel is not shown for the purposes of clarity.
Figure 5:
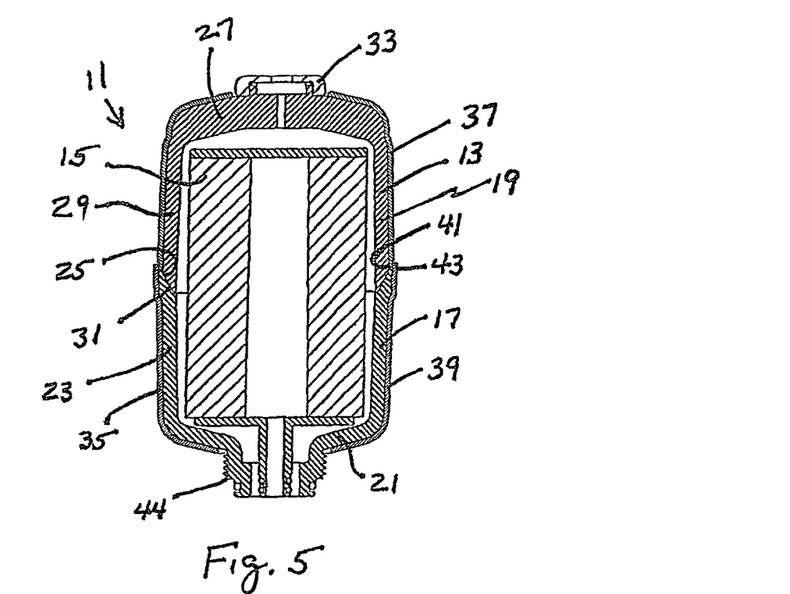
FIG. 5 is a view in cross-section taken along the lines and arrows 5-5 shown in FIG. 3, with the cartridge housed inside the pressure vessel being shown schematically.

The shell 35 may be formed around the pressure vessel 13 using a variety of methods. For example, the shell may comprise a molded fire retardant containing polymer shell bowl 37 and a molded fire retardant containing polymer shell cover 39 that are sealingly joined together by forming a bond between the rim 41 of the shell bowl 37 and the rim 43 of the shell cover 39 using an adhesive or welded joint, for instance, after the shell cover 39 is placed over the cover 17 of the pressure vessel 13 and after the shell bowl 37 is placed over the bowl 19 of the pressure vessel 13. Adhesive also may be used to join other portions of the shell 35 to the pressure vessel 13. Alternatively, the shell 35 may be formed in place over the pressure vessel 13 using insert molding or overmolding processes. If desired, the shell 35 may be formed in place over the pressure vessel 13 such that the shell 35 becomes integrally joined to the pressure vessel 13, such as by heating the shell 35 to shrink it onto the pressure vessel 13. Because the shell 35 may be positioned on the pressure vessel 13 after the pressure vessel 13 has been formed, the pressure vessel 13 and the filtering medium 15 housed therein first may be tested to determine if the pressure vessel 13 and the filtering medium 15 housed therein meet quality control standards for the pressure vessel 13 and the filtering medium 15 held within the pressure vessel 13 before a shell 35 is positioned around the pressure vessel 13, thereby avoiding providing shells 35 to pressure vessels 13 having filtering medium 15 contained therein that do not meet quality control standards.

In use, the apparatus 11 filters and/or purifies and/or conditions fluid, such as water, passing through the filtering medium 15 contained in the pressure vessel by removing impurities contained in the fluid using the filtering medium 15 to produce a treated fluid, such as potable water if the fluid is water. The pressure vessel 13, which holds the filtering medium 15 therein, comprises a material that is strong enough to handle the pressure created within the pressure vessel 13 during use of the pressure vessel 13 and that is compatible with the production of the treated fluid (e.g., potable water if the fluid is water). The shell 35, which has sufficient anti-flammability properties, protects the pressure vessel 13 and its contents from the outside agency of fire. Further, if the pressure vessel 13 is damaged to the extent that portions of the filtering medium 15 or the pressure vessel 13 break loose, the shell 35 may entrap such portions inside the shell 35 to protect the surrounding environment outside the shell 35 for damage caused by being exposed to such materials.

The shell 35 need not cover the threaded neck 44 of the pressure vessel 13 because this portion of the pressure vessel 13 is positioned inside a valve head during use. Prior to use of the apparatus 11, preferably a removable fire retardant cap is provided to cover the neck 44 of the pressure vessel 13.

Figure 8:
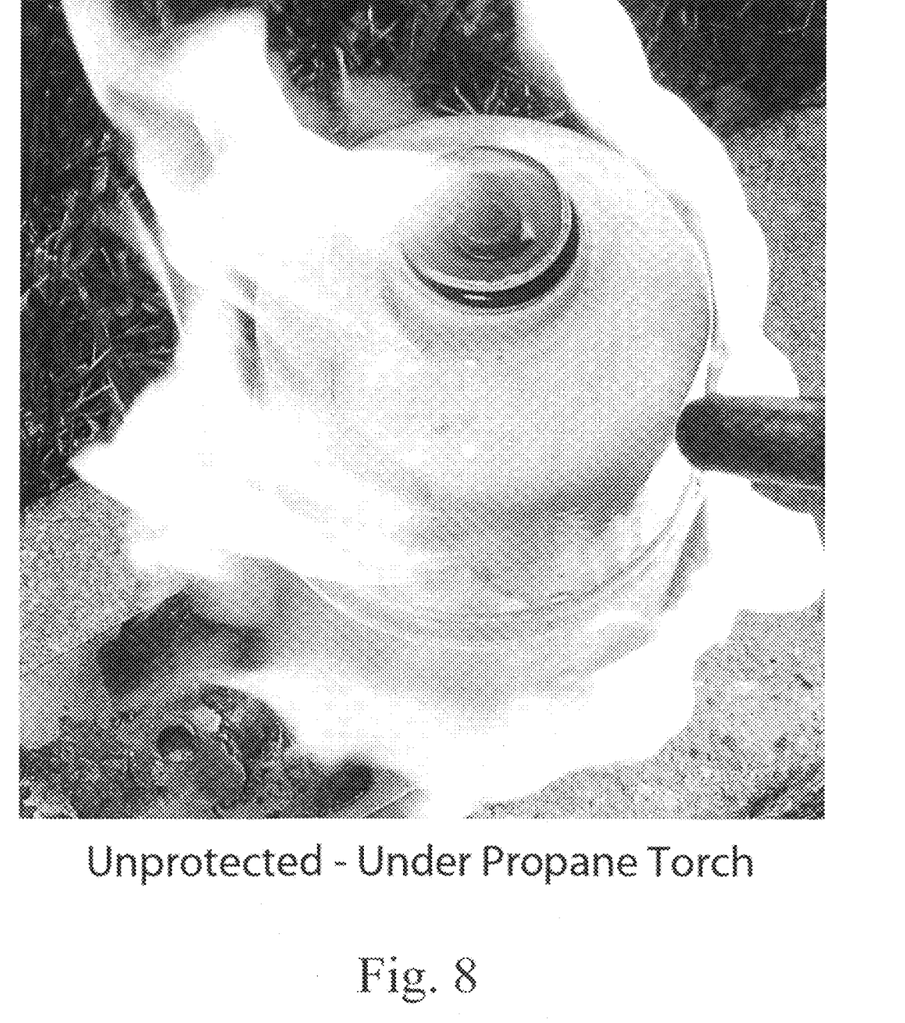
FIGS. 8 and 9 are photographs illustrating a test performed on a polypropylene pressure vessel containing a filtering medium, said pressure vessel and filtering medium not being protected by a protective shell of the invention.
Figure 9:
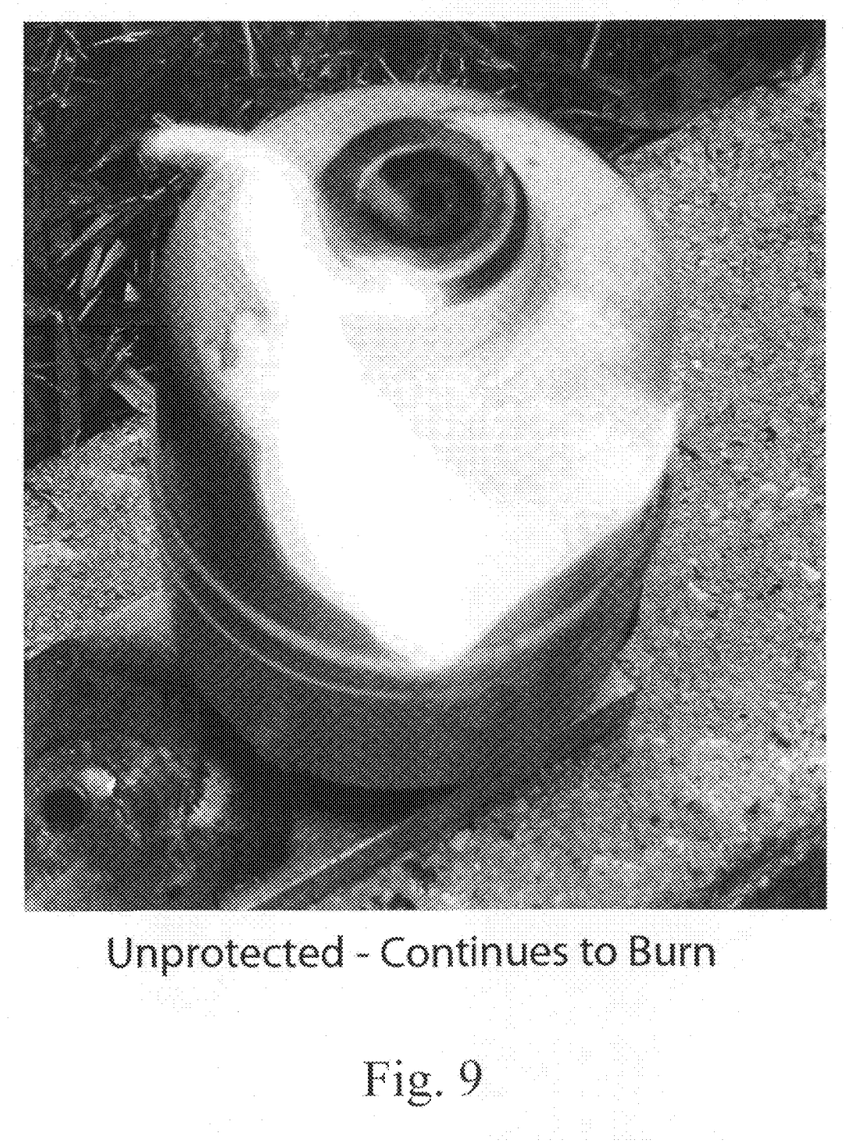

Tests were run to illustrate the invention. In one test, a polypropylene pressure vessel 13 (not protected by a protective shell 35 of the invention) containing a filtering medium 15 was subjected to a flame from a propane torch for 12 seconds. As shown in FIG. 8, there was a significant amount of flames, smoke, and fumes. The flame of the propane torch was removed from the pressure vessel 13 after 12 seconds, but the pressure vessel 13 continued to burn on its own, as shown in FIG. 9, and there still was a significant amount of smoke and fumes being generated by the burning pressure vessel 13.

Figure 10:
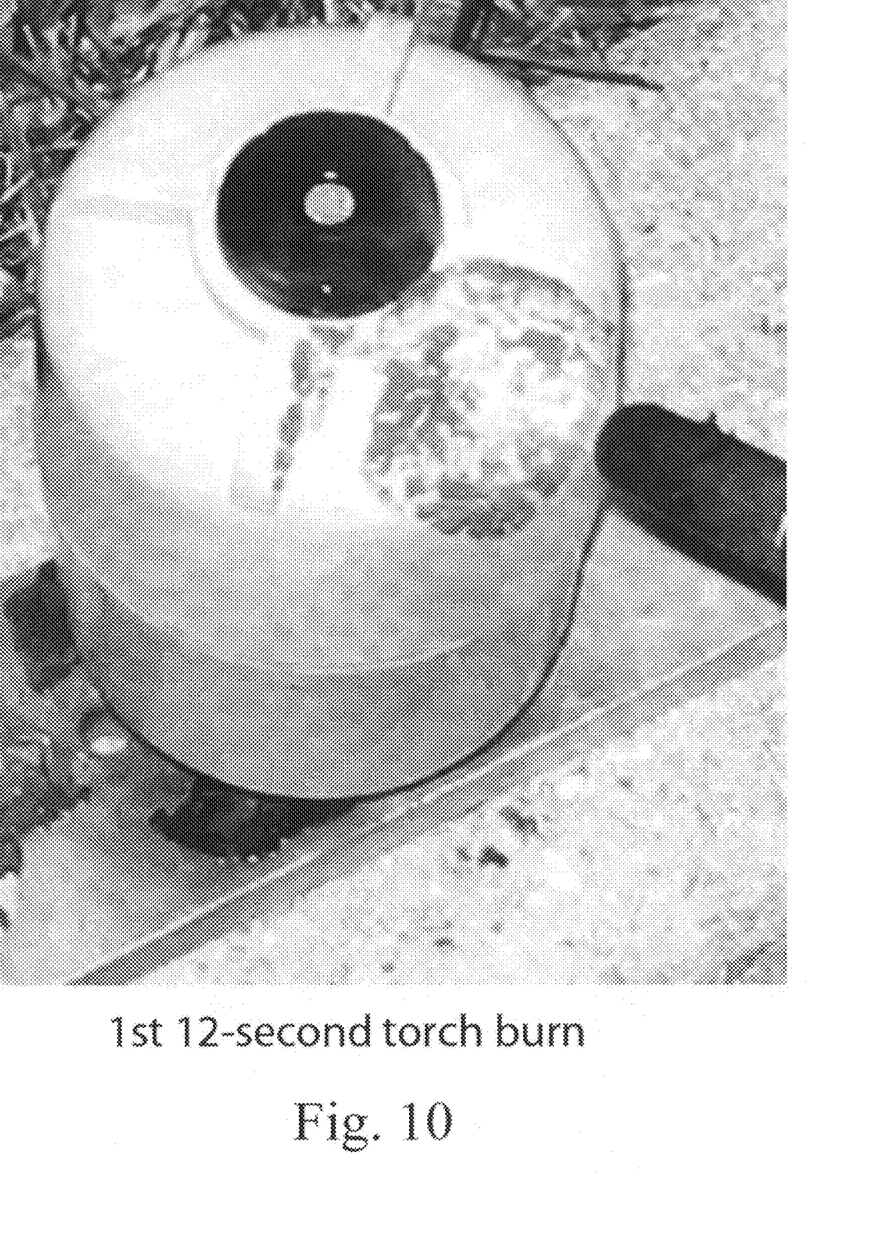
FIGS. 10-13 are photographs illustrating a test performed on an apparatus 11 of the invention.
Figure 11:
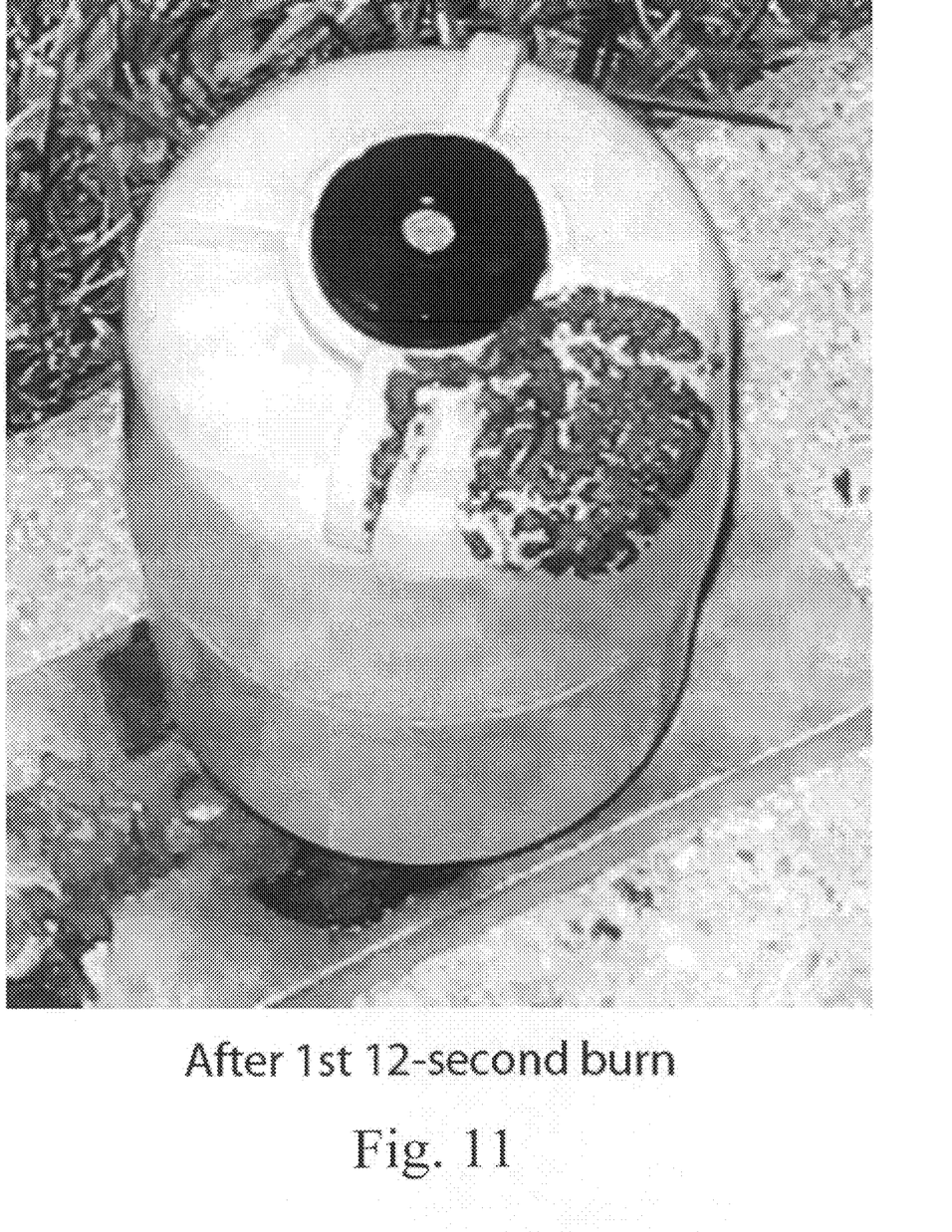
Figure 12:
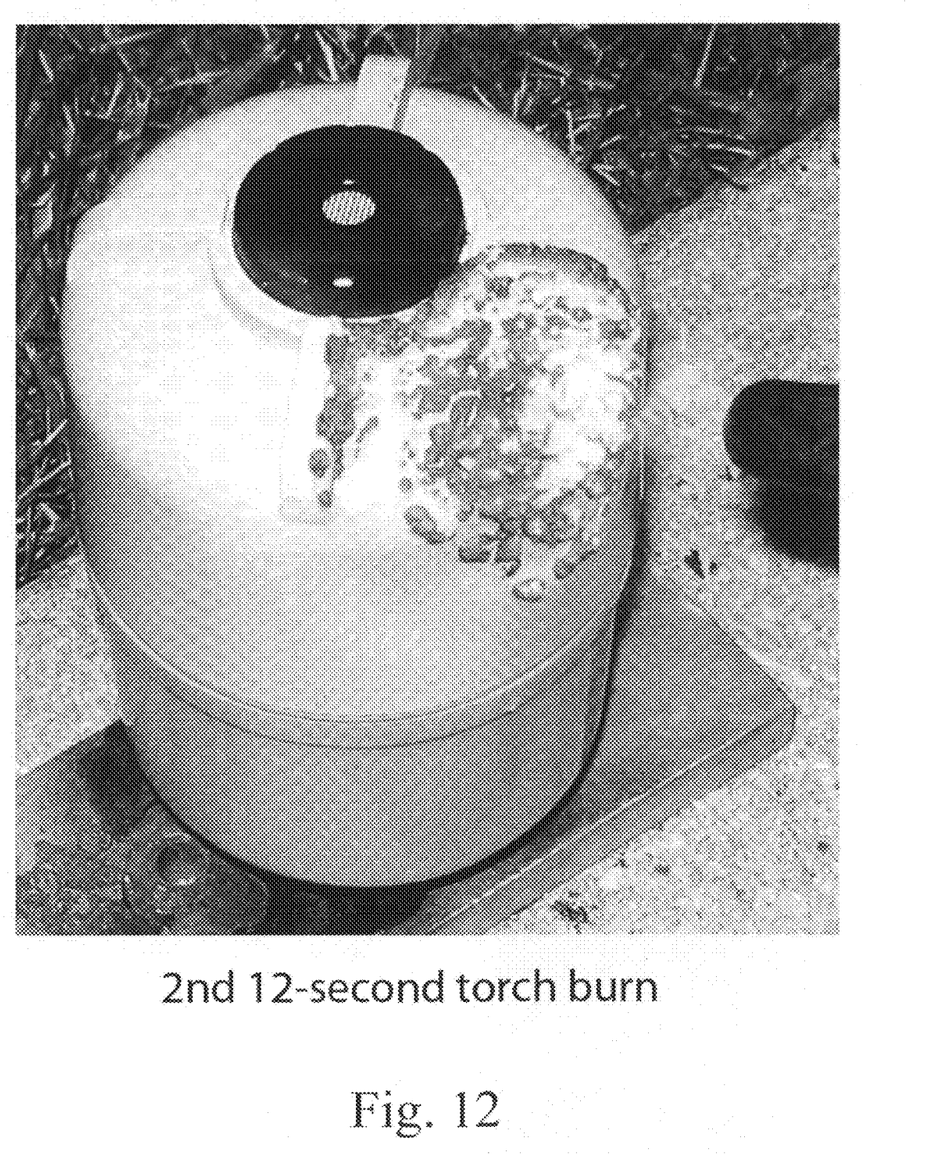
Figure 13:
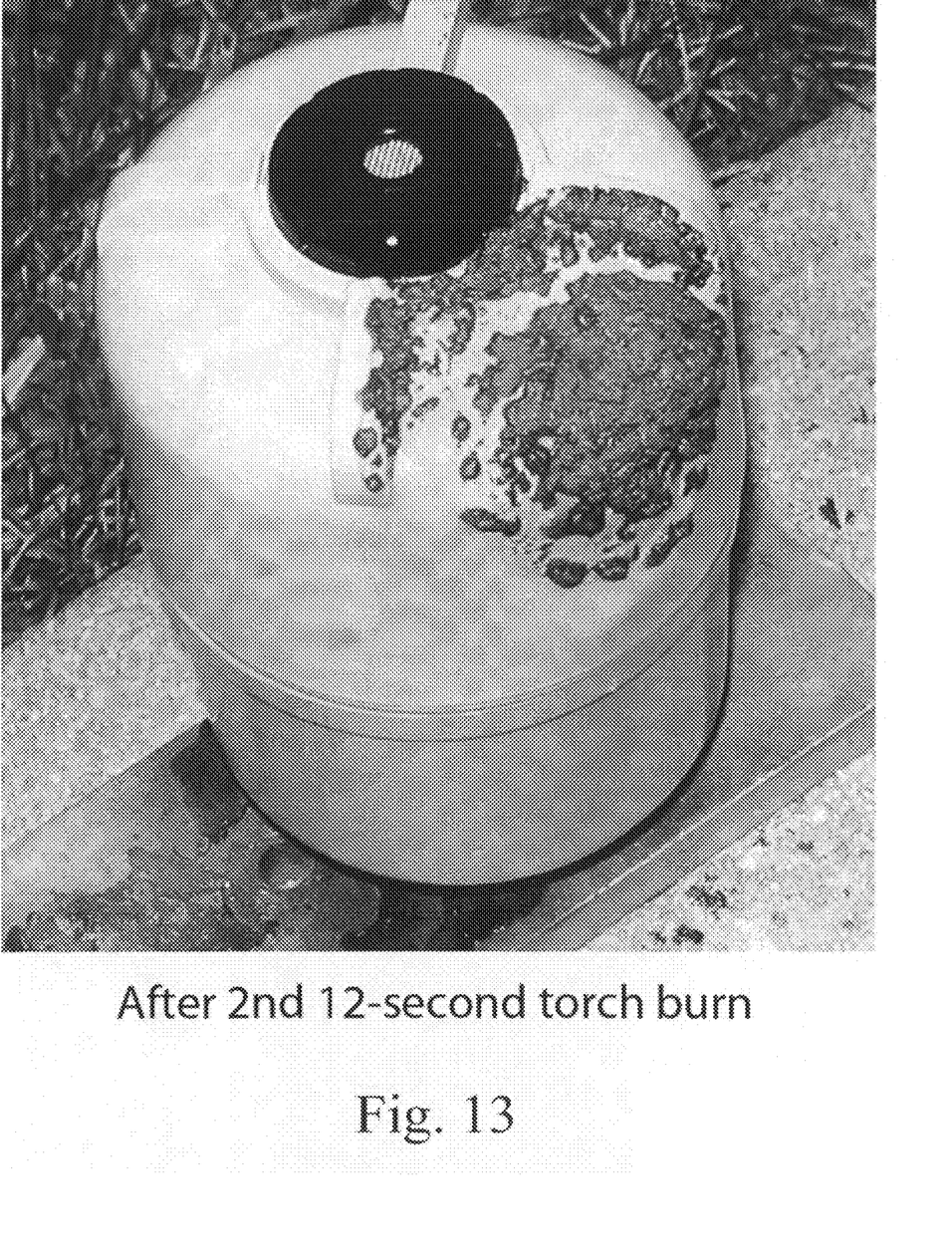

In a second test, the apparatus 11, which comprised a fire resistant shell 35 surrounding a pressure vessel 13 containing a filtering medium 15, was subjected to a flame (as shown in FIG. 10) of a propane torch being applied to the shell 35 of the apparatus 11 for 12 seconds. Then, the flame of the propane torch was removed (that is, was no longer applied to the apparatus 11), and the flames from the burning shell 35 self-extinguished in less than 1 second, leaving a portion of the outer surface of the shell 35 charred, as shown in FIG. 11. After 12 seconds had passed from when the flame of the propane torch had been removed from being applied to the apparatus 11, the flame of the propane torch was again applied (as shown in FIG. 12) to the shell 35 of the apparatus 11 in the same place on the shell 35 that the propane torch flame had originally been applied for an additional 12 seconds. The flame of the propane torch then was removed (that is, was no longer applied to the apparatus 11), and the flames from the burning shell 35 self-extinguished in less than 2 seconds, leaving a portion of the outer surface of the shell 35 further charred, as shown in FIG. 13. Throughout this flammability test, the shell 35 protected the pressure vessel 13 and the filtering medium 15 contained therein from catching on fire and from the damage that could have been caused thereby.

Figure 14:
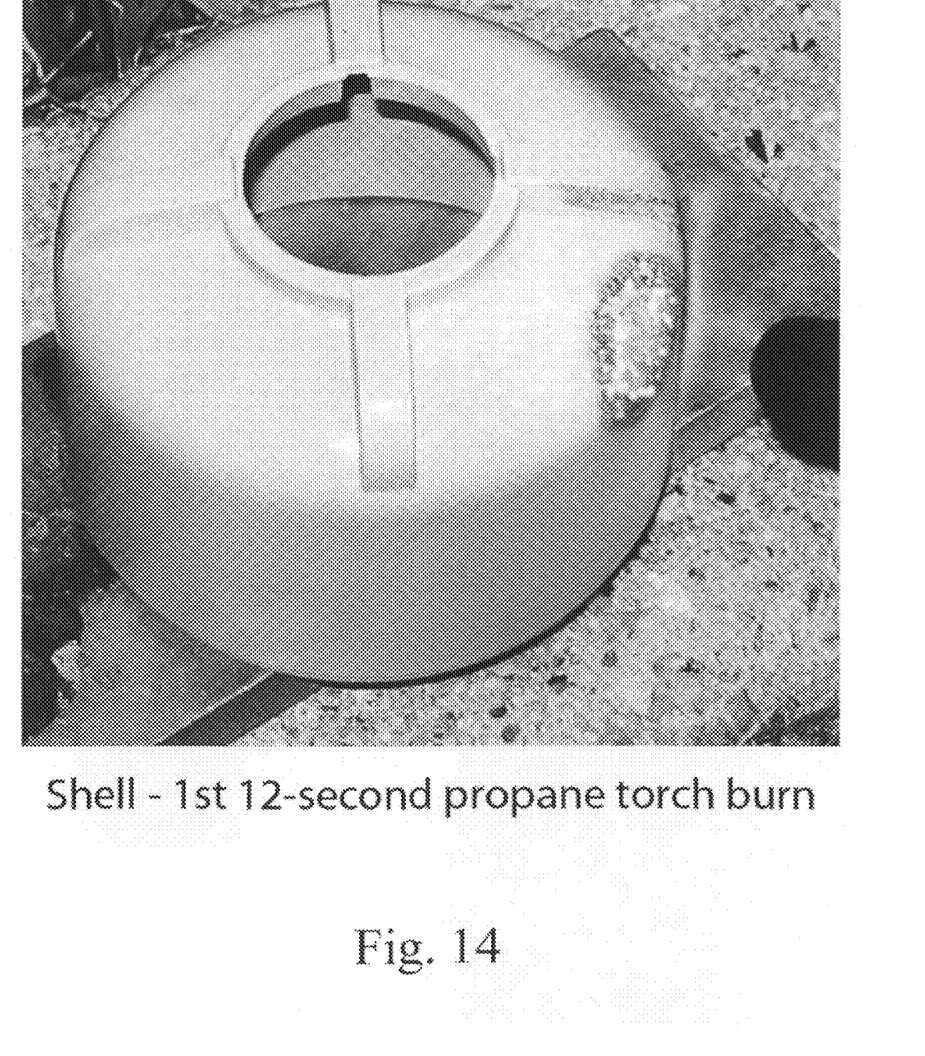
FIGS. 14-17 are photographs illustrating a test performed on a shell bowl 37 of the invention.
Figure 15:
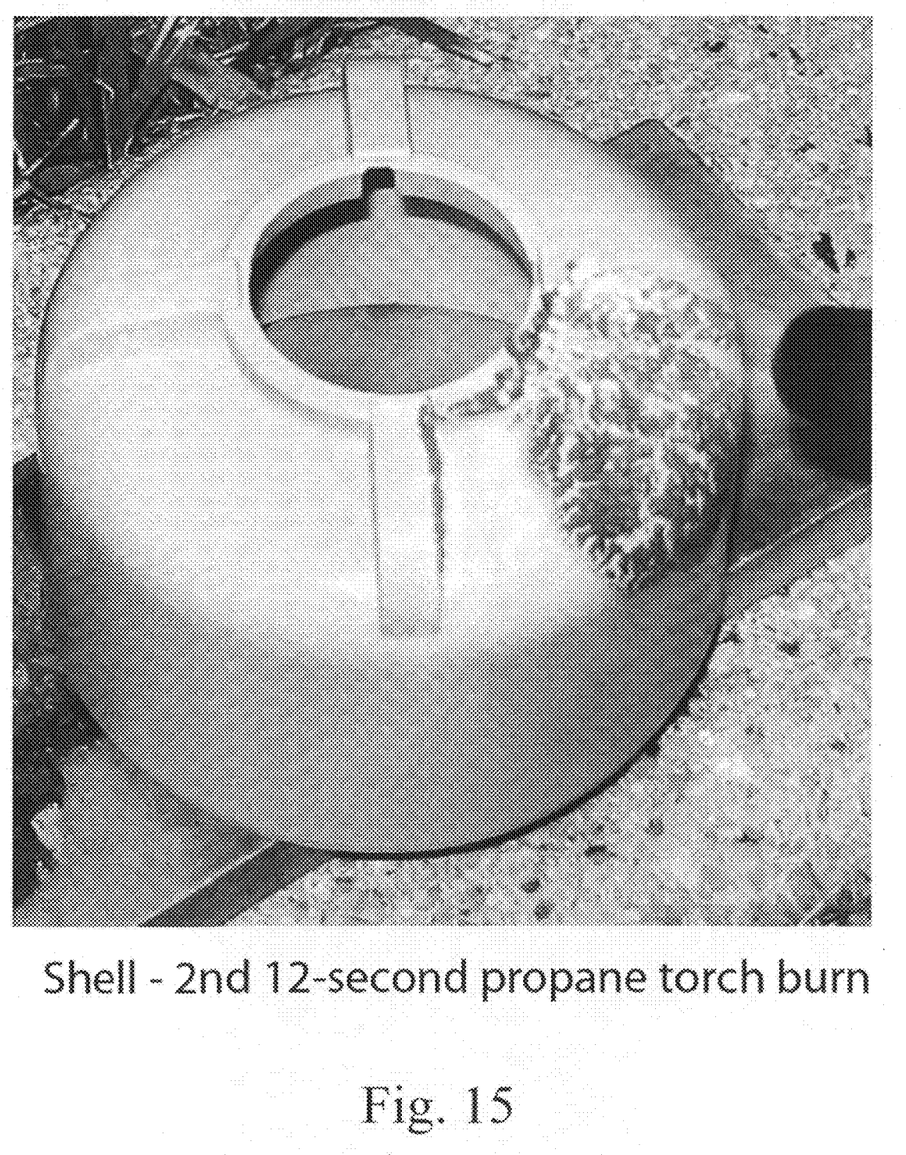
Figure 16:
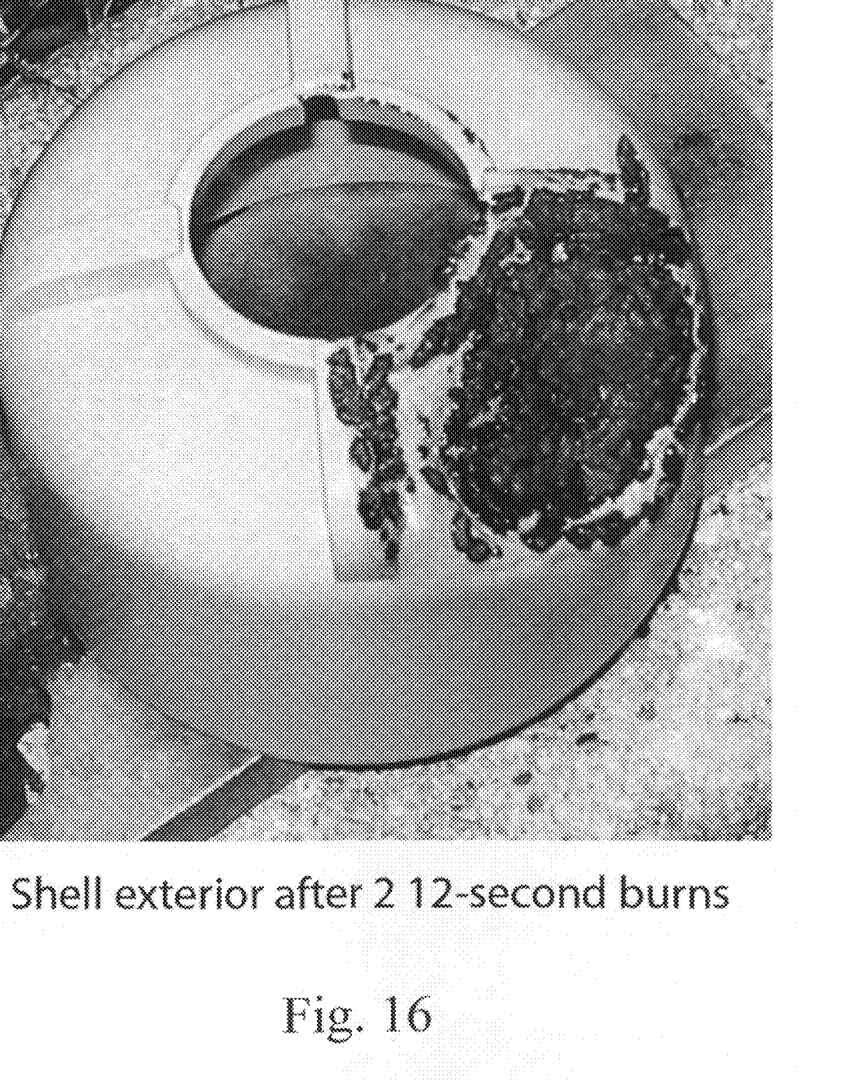
Figure 17:
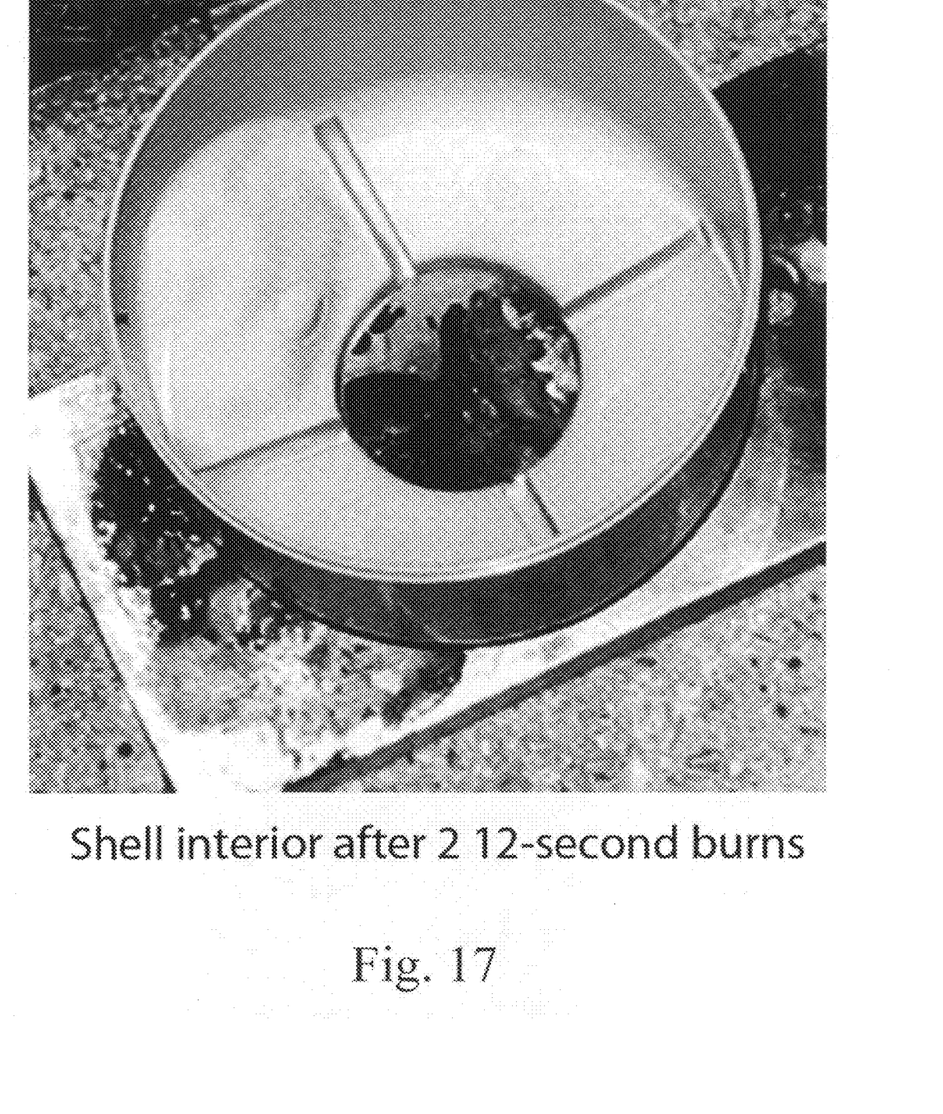

In a third test, a shell bowl 37 of the invention was subjected to a flame (as shown in FIG. 14) of a propane torch for 12 seconds. Then, the flame of the propane torch was removed (that is, was no longer applied to the shell bowl 37), and the flames from the burning shell bowl 37 self-extinguished in less than 1 second, leaving a portion of the outer surface of the shell bowl 37 charred. After 12 seconds had passed from when the flame of the propane torch had been removed from being applied to the shell bowl 37, the flame from the propane torch was again applied (as shown in FIG. 15) to the shell bowl 37 in the same place that the propane torch flame had originally been applied on the shell bowl 37 for an additional 12 seconds. The flame of the propane torch then was removed (that is, was no longer applied to the shell bowl 37), and the flames from the burning shell 37 self-extinguished in less than 2 seconds, leaving a portion of the outer surface of the shell bowl 37 further charred, as shown in FIG. 16. As shown in FIG. 17, while the interior surface of the shell bowl 37 shows some plastic deformation after the 2 applications of the flame of the propane torch to the outer surface of the shell bowl, the shell bowl 37 has not been burned through.

Figure 6:
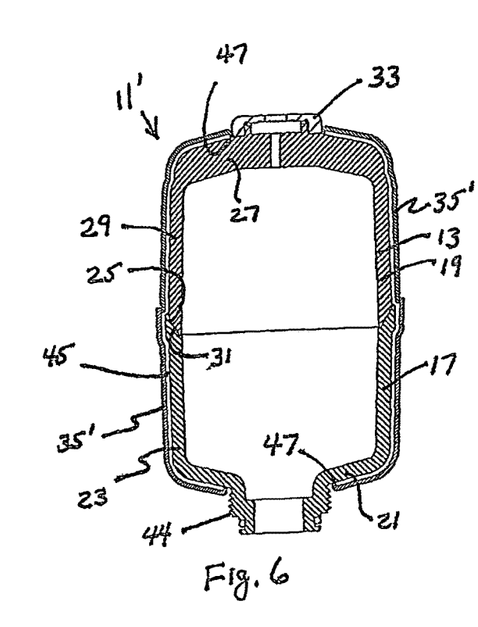
FIG. 6 is a view in cross-section of a second illustrative embodiment of the invention, wherein an alternative embodiment of the apparatus 11 of FIGS. 1-5 is shown, except the cartridge housed inside the pressure vessel is not shown for the purposes of clarity.
Figure 7:
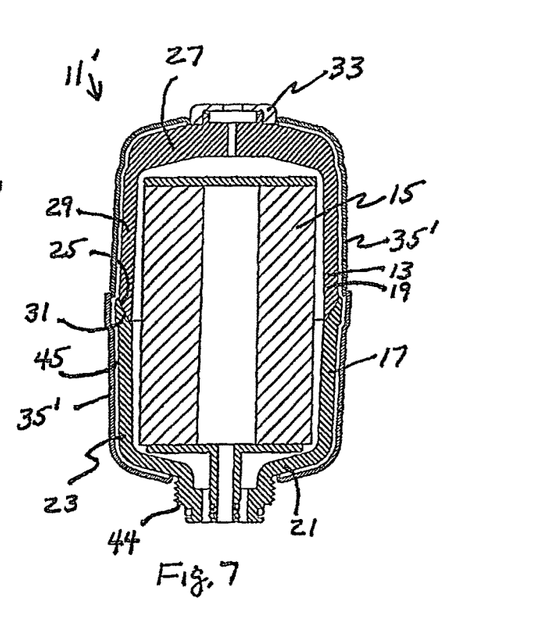
FIG. 7 is a view in cross-section of the apparatus 11' shown in FIG. 6, except the cartridge housed inside the pressure vessel is shown schematically.

Turning now to FIGS. 6 to 7 there is shown an alternative embodiment of the invention illustrated in FIGS. 1 to 5. This embodiment of the invention is substantially the same as the embodiment of the invention shown in FIGS. 1 to 5, except the shell 35' of the apparatus 11' of this embodiment is positioned around the pressure vessel 13 such that an air space or air gap 45 is created between the shell 35' and the pressure vessel 13. The air gap 45 may be created in a variety of ways, such as by using a shell 35' that has a larger inner diameter than the inner diameter of the shell 35 of the embodiment of the invention shown in FIGS. 1 to 5. In this alternative embodiment, ribs 47 preferably are provided on the shell 35' to support the shell 35' and space it uniformly away from the pressure vessel 13. The height of the ribs 47 may be selected to obtain a thickness of the air gap 45 seen as best suited for the environment that the apparatus 11' is used. The air gap 45 in some instances may provide insulation to resist against freezing occurring inside the pressure vessel 13 due to a cold environment outside the shell 35', or to resist against a hot environment outside the shell 35' interfering with the operation of the apparatus 11'.

In general, the inventive apparatus for protecting a system from being damaged by an outside agency (e.g., objects, sunlight, chemicals, temperature, electrical interference, and/or fire) found outside the system in its environment of use and/or for protecting said environment from being damaged preferably comprises a first housing (e.g., pressure vessel 13) for holding the system (e.g., system for producing potable water), and a second housing (e.g., shell 35, shell 35') surrounding the first housing (e.g., pressure vessel 13) for protecting the system (e.g., system for producing potable water) and the first housing (e.g., pressure vessel 13) from being damaged or compromised by an outside agency (e.g., fire) found outside of the system (e.g., system for producing potable water) in its environment of use (e.g., airplane galley) by blocking the outside agency (e.g., fire) with the second housing (e.g., shell 35, shell 35'), and/or for entrapping material (e.g., filtering medium 15) of the system (e.g., system for producing potable water) and/or material of the first housing (e.g., pressure vessel 13) inside the second housing (e.g., shell 35, shell 35') to protect said environment from being damaged caused by being exposed to material (e.g., filtering medium 15) of the system (e.g., system for producing potable water) and/or material of the first housing (e.g., pressure vessel 13), wherein the first housing (e.g., pressure vessel 13) comprises a material (e.g., a polymer such as polypropylene) that is compatible with the needs of the system (e.g., system for producing potable water), and wherein the second housing (e.g., shell 35, shell 35') comprises a material (e.g., a polymer such as polypropylene containing a fire retardant) that permits the second housing (e.g., shell 35, shell 35') to protect the first housing (e.g., pressure vessel 13) and the system (e.g., system for producing potable water) against being damaged or compromised by an outside agency (e.g., fire) found outside the second housing (e.g., shell 35, shell 35') in the environment of use (e.g., airplane galley) of the system (e.g., system for producing potable water). The material (e.g., a polymer such as polypropylene containing a fire retardant) of the second housing (e.g., shell 35, shell 35') need not be suitable for use as the material of the first housing (e.g., pressure vessel 13), and the material (e.g., a polymer such as polypropylene) of the first housing (e.g., pressure vessel 13) need not be suitable for use as the material of the second housing (e.g., shell 35, shell 35').

Also, in general, the inventive method for protecting a system from being damaged by an outside agency (e.g., objects, sunlight, chemicals, temperature, electrical interference, and/or fire) found outside the system in its environment of use and/or for protecting said environment from being damaged preferably comprises the steps of holding a system (e.g., system for producing potable water) in a first housing (e.g., pressure vessel 13), and protecting the first housing (e.g., pressure vessel 13) and the system (e.g., system for producing potable water) held therein from being damaged or compromised by an outside agency (e.g., fire) found outside the system (e.g., system for producing potable water) in the environment of use (e.g., airplane galley) of the system (e.g., system for producing potable water) by surrounding the first housing (e.g., pressure vessel 13) and the system (e.g., system for producing potable water) held therein with a second housing (e.g., shell 35, shell 35') to block against the outside agency (e.g., fire), and/or protecting said environment (e.g., airplane galley) from being damaged caused by being exposed to material (e.g., filtering medium 15) of the system (e.g., system for producing potable water) and/or material of the first housing (e.g., pressure vessel 13) by surrounding the first housing (e.g., pressure vessel 13) and the system (e.g., system for producing potable water) held therein with a second housing (e.g., shell 35, shell 35') to entrap material (e.g., filtering medium 15) of the system (e.g., system for producing potable water) and/or material of the first housing (e.g., pressure vessel 13) inside the second housing (e.g., shell 35, shell 35'), wherein the first housing (e.g., pressure vessel 13) comprises a material that is compatible with the system (e.g., system for producing potable water), wherein the second housing (e.g., shell 35, shell 35') comprises a material that permits the second housing (e.g., shell 35, shell 35') to protect the first housing (e.g., pressure vessel 13) and the system (e.g., system for producing potable water) against being damaged or compromised by an outside agency (e.g., fire) found outside the second housing in the environment of use (e.g., airplane galley) of the system (e.g., system for producing potable water), wherein the material of the second housing (e.g., shell 35, shell 35') need not be suitable for use as the material of the first housing (e.g., pressure vessel 13), and wherein the material of the first housing (e.g., pressure vessel 13) need not be suitable for use as the material of the second housing (e.g., shell 35, shell 35').

The invention claimed is:

1. An apparatus for protecting a system from being damaged by an outside agency found outside the system in its environment of use and/or for protecting said environment from being damaged, comprising
   a first housing for holding the system, the first housing forming a pressure vessel, the pressure vessel being closed off from the atmosphere during use,
   the first housing having means for connecting it to a valve head, and
   the first housing including means for mounting material for filtering and/or purifying and/or conditioning water therein, and
     second housing means surrounding the first housing for protecting the system and the first housing from being damaged or compromised by an outside agency found outside of the system in its environment of use by blocking the outside agency with the second housing means, and/or for entrapping material of the system and/or material of the first housing inside the second housing means to protect said environment from being damaged caused by being exposed to material of the system and/or material of the first housing,
   the second housing being adjacent to the first housing without any other housing being positioned therebetween,
   the first housing comprising a first housing material that is compatible with the system and with water, the first housing material of the first housing being polypropylene, acetal, ABS, or polysulfone, and
   the second housing means comprising a second housing material that permits the second housing means to protect the first housing and the system against being damaged or compromised by an outside agency found outside the second housing means in the environment of use of the system, the second housing material of the second housing means being a polymer containing a fire retardant, the polymer being polypropylene or polyethylene,
   wherein the second housing means protects the system and first housing from being directly exposed to a flame having an intensity of a flame from a propane torch up to at least 12 seconds when such a flame is applied to the second housing means.

2. The apparatus of claim 1,
   the material of the second housing means having at least 25% by weight fire retardant.

3. The apparatus of claim 1, wherein said second housing means is self-extinguishing when a previous flame to which the second housing means is exposed is withdrawn.

4. The apparatus of claim 1, wherein said first housing has an outer surface and wherein said second housing means engages said first housing along the outer surface thereof.

5. The apparatus of claim 4, wherein said first housing and said second housing are integrally joined to form a unit.

6. The apparatus of claim 1, wherein said first housing extends beyond said second housing means.

7. The apparatus of claim 1, wherein said first housing includes a neck and wherein said neck extends beyond said second housing means.

8. The apparatus of claim 1,
   the fire retardant being a char-forming intumescent based composition.

9. The apparatus of claim 8,
   the material of the second housing means having about 25% to about 35% by weight fire retardant.

10. The apparatus of claim 1,
    the fire retardant being aminophosphate.

11. The apparatus of claim 1,
    the fire retardant being a metal hydroxide.

12. The apparatus of claim 11,
    the material of the second housing means having about 50% to about 60% by weight fire retardant.

13. The apparatus of claim 1,
    the fire retardant being magnesium hydroxide.

14. The apparatus of claim 1, wherein an air gap is created between the first housing and the second housing means.

15. The apparatus of claim 1, wherein ribs are provided on the second housing means to support the second housing means and space it uniformly away from the first housing.

16. A method for protecting a system from being damaged by an outside agency found outside the system in its environment of use and/or for protecting said environment from being damaged, comprising the steps of
   holding the system in a first housing,
   the system comprising a water filtering/purifying/conditioning system to enable production of potable water,
   the first housing forming a pressure vessel,
   the pressure vessel being closed off from the atmosphere during use,
   the first housing having means for connecting it to a valve head, and
   the first housing including means for mounting material for filtering and/or purifying and/or conditioning water therein, and
   forming a second housing using a molding process, protecting the first housing and the system held therein from being damaged or compromised by an outside agency found outside the system in the environment of use of the system by surrounding the first housing and the system held therein with the second housing to block against the outside agency, and/or protecting said environment from being damaged caused by being exposed to material of the system and/or material of the first housing by surrounding the first housing and the system held therein with a second housing to entrap material of the system and/or material of the first housing inside the second housing, the first housing comprising a material that is compatible with the system, the second housing being adjacent to the first housing without any other housing being positioned therebetween, and the second housing comprising a material that permits the second housing to protect the first housing and the system against being damaged or compromised by an outside agency found outside the second housing in the environment of use of the system, the material of the second housing being a polymer containing a fire retardant.

17. The method of claim 16, the material of the first housing being polypropylene, acetal, ABS, or polysulfone, and the polymer of the second housing being polypropylene or polyethylene.

18. The method of claim 16, further including the step of testing the system prior to surrounding the first housing with the second housing.

19. The method of claim 16, the fire retardant being a char-forming intumescent based composition.

20. The method of claim 16, the fire retardant being aminophosphate.

21. The method of claim 16, the fire retardant being a metal hydroxide.

22. The method of claim 16, the fire retardant being magnesium hydroxide.

23. The method of claim 16, the material of the second housing having about 25% to about 35% by weight fire retardant.

24. The method of claim 16, the material of the second housing having about 50% to about 60% by weight fire retardant.

25. The method of claim 16, wherein an air gap is created between the first housing and the second housing.

26. The method of claim 16, wherein ribs are provided on the second housing to support the second housing and space it uniformly away from the first housing.

27. An apparatus for protecting a system from being damaged by an outside agency found outside the system in its environment of use and/or for protecting said environment from being damaged, consisting of a first housing for holding the system, the first housing forming a pressure vessel, the pressure vessel being closed off from the atmosphere during use, the first housing having means for connecting it to a valve head, and the first housing including means for mounting material for filtering and/or purifying and/or conditioning water therein, and second housing means surrounding the first housing for protecting the system and the first housing from being damaged or compromised by an outside agency found outside of the system in its environment of use by blocking the outside agency with the second housing means, and/or for entrapping material of the system and/or material of the first housing inside the second housing means to protect said environment from being damaged caused by being exposed to material of the system and/or material of the first housing, the first housing comprising a first housing material that is compatible with the system and with water, the first housing material of the first housing being polypropylene, acetal, ABS, or polysulfone, and the second housing means comprising a second housing material that permits the second housing means to protect the first housing and the system against being damaged or compromised by an outside agency found outside the second housing means in the environment of use of the system, the second housing material of the second housing means being a polymer containing a fire retardant, the polymer being polypropylene or polyethylene, wherein the second housing means protects the system and first housing from being directly exposed to a flame having an intensity of a flame from a propane torch up to at least 12 seconds when such a flame is applied to the second housing means.

* * * * *